(No Model.) 9 Sheets—Sheet 1.
A. JOHNSON.
PNEUMATIC DESPATCH TUBE SYSTEM.
No. 600,536. Patented Mar. 15, 1898.

Fig. 1.

WITNESSES:
J. A. Hurdle
John MacDougall

INVENTOR
Asa Johnson (No Model.) 9 Sheets—Sheet 4.
A. JOHNSON.
PNEUMATIC DESPATCH TUBE SYSTEM.

No. 600,536. Patented Mar. 15, 1898.

(No Model.) 9 Sheets—Sheet 5.

A. JOHNSON.
PNEUMATIC DESPATCH TUBE SYSTEM.

No. 600,536. Patented Mar. 15, 1898.

WITNESSES: INVENTOR
J. A. Hurdle Asa Johnson
John Macdougall

(No Model.) 9 Sheets—Sheet 6.

A. JOHNSON.
PNEUMATIC DESPATCH TUBE SYSTEM.

No. 600,536. Patented Mar. 15, 1898.

WITNESSES:

INVENTOR
Asa Johnson (No Model.) 9 Sheets—Sheet 7.

A. JOHNSON.
PNEUMATIC DESPATCH TUBE SYSTEM.

No. 600,536. Patented Mar. 15, 1898.

WITNESSES: INVENTOR (No Model.) 9 Sheets—Sheet 9.

A. JOHNSON.
PNEUMATIC DESPATCH TUBE SYSTEM.

No. 600,536. Patented Mar. 15, 1898.

WITNESSES:
J. A. Hurdle
John MacDougall

INVENTOR:
Asa Johnson

UNITED STATES PATENT OFFICE.

ASA JOHNSON, OF NEW YORK, N. Y., ASSIGNOR OF ONE-HALF TO WILLIAM H. JOHNSON, OF SAME PLACE.

PNEUMATIC-DESPATCH-TUBE SYSTEM.

SPECIFICATION forming part of Letters Patent No. 600,536, dated March 15, 1898.

Application filed April 14, 1892. Serial No. 429,226. (No model.)

*To all whom it may concern:*

Be it known that I, ASA JOHNSON, a citizen of the United States, residing in the city, county, and State of New York, have invented certain new and useful Improvements in Pneumatic-Despatch-Tube Systems, fully set forth in the following description and represented in the accompanying drawings.

The present invention relates generally to pneumatic-tube apparatus for the transmission of packages, articles, or other matters or substances between distant points and adapted either for use in stores, warehouses, and the like or for other situations, such as in streets and in underground apparatus.

The improvements relate to the pneumatic-tube structure as a whole and to its several parts, whereby a simple, efficient, and economical apparatus is produced, and said improvements consist in the novel construction and arrangement of parts hereinafter fully set forth.

In the accompanying drawings the apparatus is illustrated particularly for use in the transmission of carriers containing the articles to be forwarded from one station to another in a store or warehouse, certain modifications thereof being specially adapted for underground conduits, in which drawings—

Figure 1 is a diagram of the apparatus arranged for a store or the like. Fig. 1$^a$ is a sectional elevation on a larger scale than Fig. 1, showing a modified arrangement of the tubes. Fig. 1$^b$ is a sectional elevation of one of the receivers shown in Fig. 1$^a$. Fig. 3 is a similar view of the blower-casing and stand with a duplex arrangement of blowers for each line of tube. Fig. 13 is a horizontal section.

The apparatus (see Fig. 1) consists in its simplest form of two lines of tubes forming a continuous circuit from a main station 100 along past one or more substations 101 and returning past the same substations back to the main station 100 and including in the circuit of said tube a suitable compressor, blower, or fan D, by which the propelling fluid is forced or drawn through the tubes. The same figure shows a second line of tubes extending from a main station 102 along and past several substations 103, returning, as in the other instance, past the same substations back to the main station 102, a blower or fan D also being in the circuit of said tube.

Figure 1:
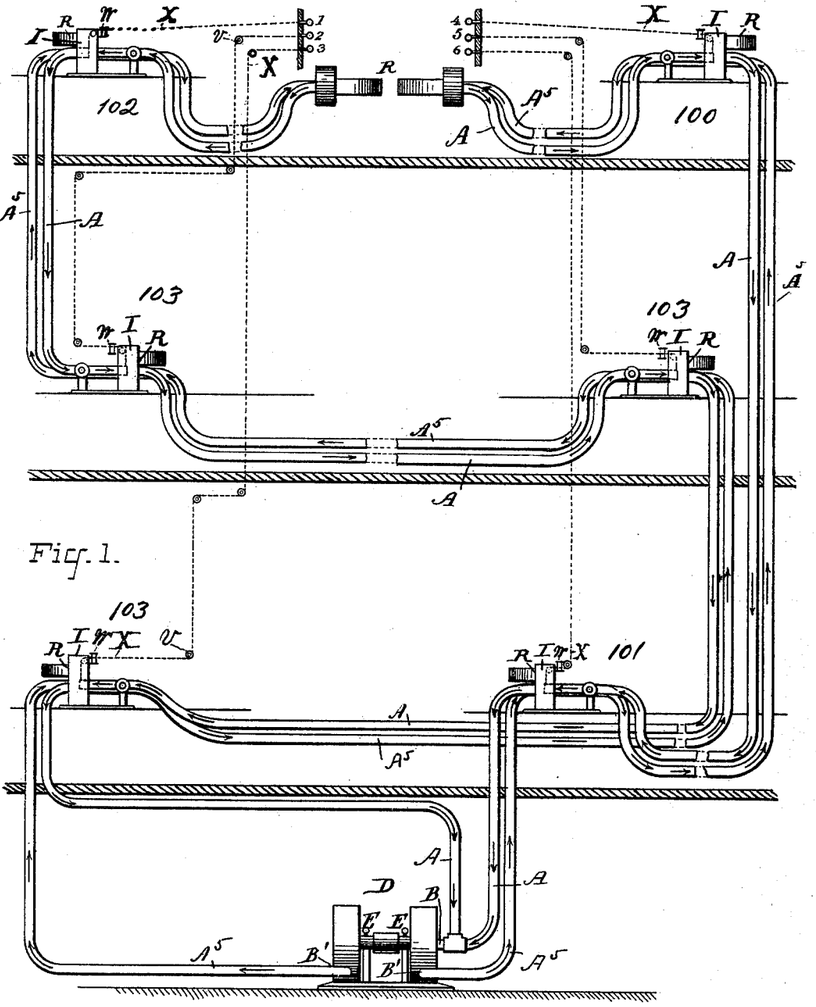
Figures 1A, 1B:
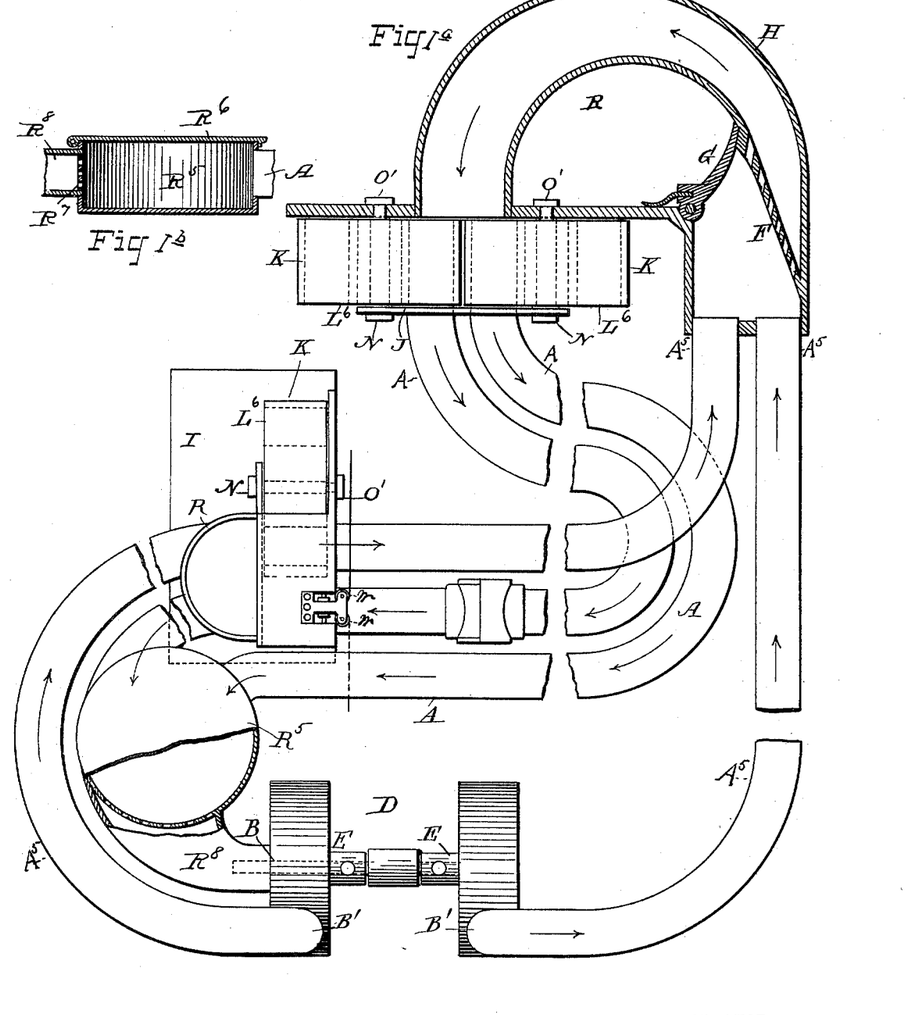
Figure 2:
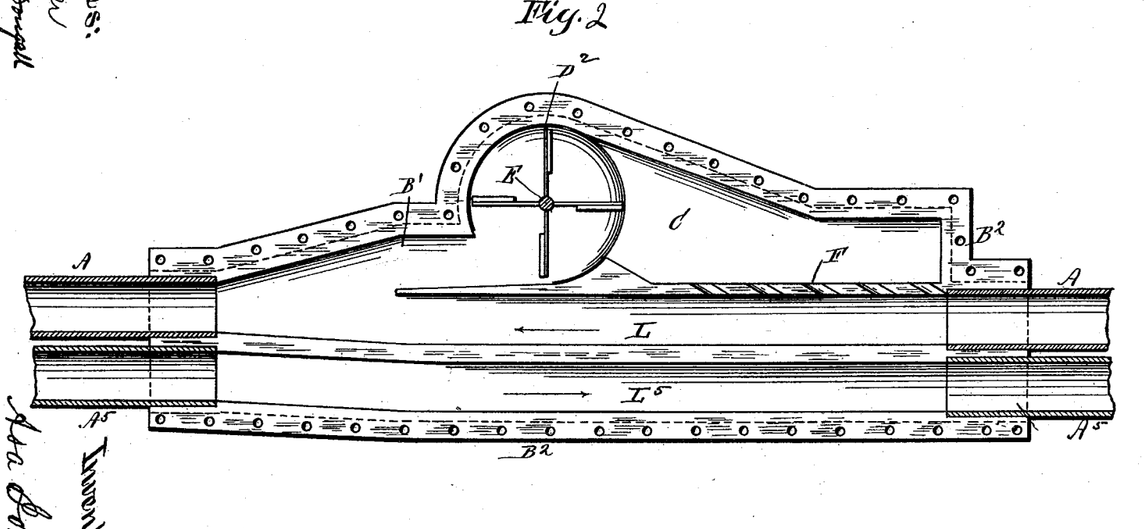
Fig. 2 is a sectional elevation of one of the preferred forms of the blower-casing and stand with its connection with the tubes.

The lines of tube consist of a forwarding-tube A, extending from the main station to the several substations and adapted to forward carriers from the main station and deliver such carriers at either one or the other of the receivers R at the substations, and such forwarding-tube extends, preferably, to the suction side B of the blower, while the other or return tube $A^3$ extends from the pressure side B' of the blower and thence back past the several substations to the receiver R of the main station. The connection of the tubes with the several substations and the main station is such that in the normal condition of the apparatus the circuit is a continuous one, and the air flows continuously from the pressure side of the blower past the several stations and back to the suction side of said blower. The blowers shown in the diagram Figs. 1 and 1$^a$ simply illustrate an ordinary fan-blower of the Sturtevant type and show a simple mode of placing such blowers in circuit with the tubes. Thus, as shown in Fig. 1, one of the blowers is connected on its suction side with the separate lines of forwarding-tubes A of the two apparatuses, while the pressure side of the same blower is connected with the return-tube $A^5$ of one apparatus, and the other blower is similarly connected to the like tube of the other apparatus. The shafts E of the two blowers unite and may be driven in unison from any suitable source of power. Substantially the same arrangement of the tubes with the blowers is also shown in Fig. 1$^a$. In the preferred form, however, as shown in Figs. 2 and 3, the blower or blowers $D^2$ are mounted within a casing $B^2$, having communication with a longitudinal channel or channels L, coinciding and forming an unobstructed continuation of the line or lines of tube which are connected to said casing and in which line or lines of tube the casing is interposed. As shown in Fig. 2, the fan-blower D communicates with one channel L, while the lower conduit $L^5$ has its pressure supplied from some other source. The suction side of the blower $D^2$ is in communication by a chamber C with the channel L through the perforations F in the separating-wall of the channel, and the pressure side B' of said blower is in communication with the same channel, so that the air is both drawn and forced through the channel and tube by the one blower. The casing $B^2$ is preferably cast in two pieces, each piece representing a longitudinal half of the casing and one being a duplicate of the other and the two bolted together to complete the casing forming the housing for the blower, the channels L and $L^5$, and the connection for the ends of the tubes, which may obviously be secured to said casing in any suitable manner, rendering the connection air-tight. The connection of the conduit L with the pressure side of the blower is flared, as shown, so as to save a special connection between the conduit and blower.

In the construction shown in Fig. 3 each of the channels through the casing and the lines of tube communicating therewith are provided with two blowers, the one blower $D^2$, as in the former structure, serving as a suction and pressure blower and the other blower $D^3$ serving as a pressure-blower only, taking its air from the outside or atmosphere instead of from the line of tube as the other one does and constituting a supplemental air-forcing device.

In both of the constructions shown in Figs. 2 and 3 the travel of the carriers through the apparatus is not obstructed by the interposition of the compressor or blower, and hence a practically-continuous circuit of tube is formed, by which the carriers may travel continuously from the main station back to such station.

The main station and the substations are in certain respects similar in that they each contain a receiver R for receiving the carriers from the tube and also embrace a delivering device K for delivering carriers to the tube for transmission to one or the other of the other stations. The receiver of the main station, as shown in Fig. 1$^a$, consists of a casting forming a terminal having connection with the return end of one or more tubes $A^5$, with an elbow or gooseneck H forming a continuation of said tube or tubes and leading around the receiver to one or more forwarding-tubes A, so that the circuit of air from the end of the return tube or tubes $A^5$ to the entrance end of the forwarding tube or tubes A is unobstructed. The entrance end of the elbow H is, however, provided with a perforated separating and deflecting plate F, which allows the air to pass onward from the tubes $A^5$ through the elbow and at the same time directs the carriers from the ends of said tubes to the entrance into the receiver R, which entrance is closed by a pivoted and spring-seated plate G to normally prevent the escape of the air from the tube, and which gate is adapted to be moved to one side by the carrier being delivered, so that such carrier finally rests in the reservoir R. The outer edge of this receiver is formed by the inner curve of the elbow H, and the deflecting-plate F extends in a line at a tangent to said curve, so that the carriers are properly directed into said receiver. While I have shown this terminal station and its receiver adapted for use with two forwarding and return tubes, it is obvious that one or more may be used.

Figure 4:
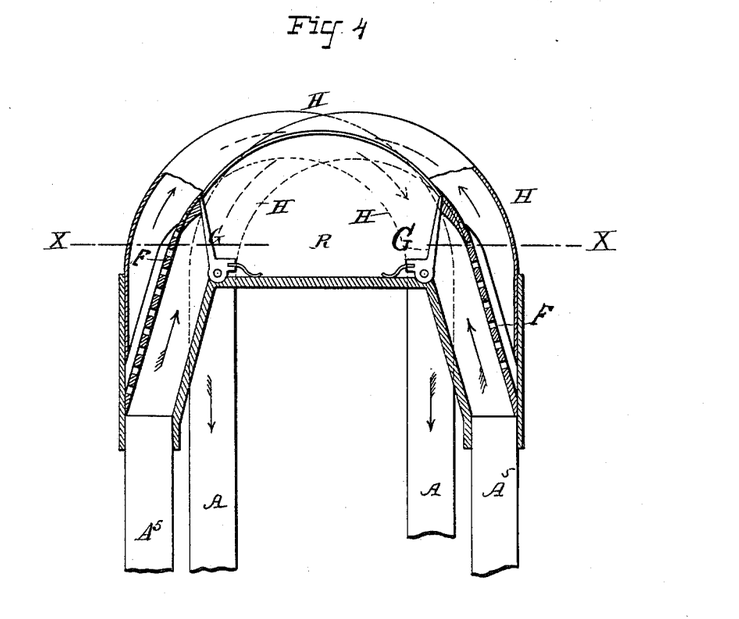
Fig. 4 is a sectional elevation of a duplex receiver and terminal, showing its connection with the return-bends of the connected tubes for the unobstructed passage of the air past such receiver.
Figure 5:
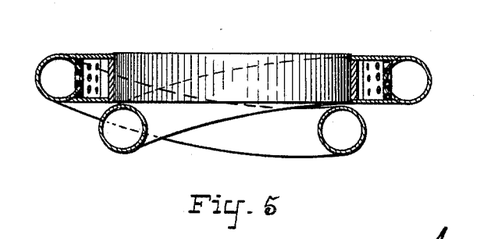
Fig. 5 is a horizontal section taken on the line X X of Fig. 4.

In Fig. 4 instead of bringing the end of the two return-tubes $A^5$ into one connection with the receiver and employing a single elbow for connection with the forwarding tube or tubes A there is shown a receiver R, connected at opposite sides to the end of a return-tube $A^5$, the entrance of each into the single receiver being closed by separate gates G, and there being a separate elbow H for each tube extending into the forwarding-tube A. The connection between the ends of the tubes $A^5$ and the elbows is separated, as before, by a perforated separating and deflecting plate F, which allows the air to go onward and directs the carriers to the gate and thence into the receiver.

The apparatus may be provided with another form of receiver $R^5$, (shown in Figs. 1$^a$ and 1$^b$,) into which the ends of one or more of the tubes A may extend, being particularly adapted for use beyond the several stations to receive any carrier that may fail of delivery at the proper station. This receiver is provided with a removable air-tight cap $R^6$, and a portion of its wall may be perforated, as at R[7], to communicate through an elbow R[8] with the suction side B of the blower D.

Figures 6, 7, 8:
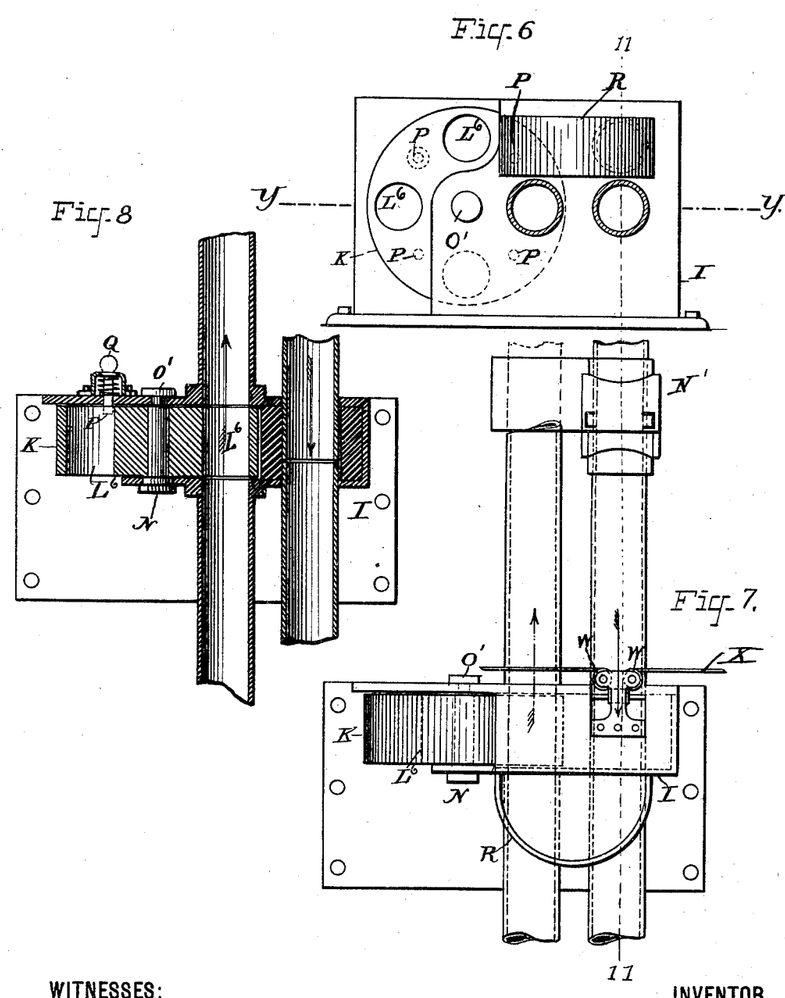
Fig. 6 is a sectional elevation showing the arrangement particularly adapted for a substation, combining a receiver to receive the carriers from the tube and a despatching device for delivering a carrier to the tube to be transmitted onward to another station.
Fig. 7 is a plan view thereof.
Fig. 8 is a horizontal section of the same, taken on the line Y Y of Fig. 6.
Figure 8:
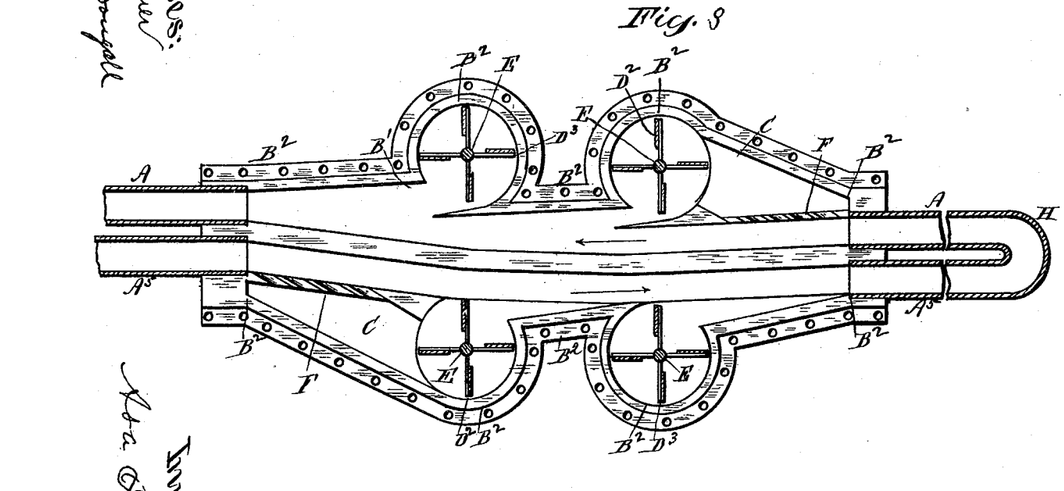
Figure 9:
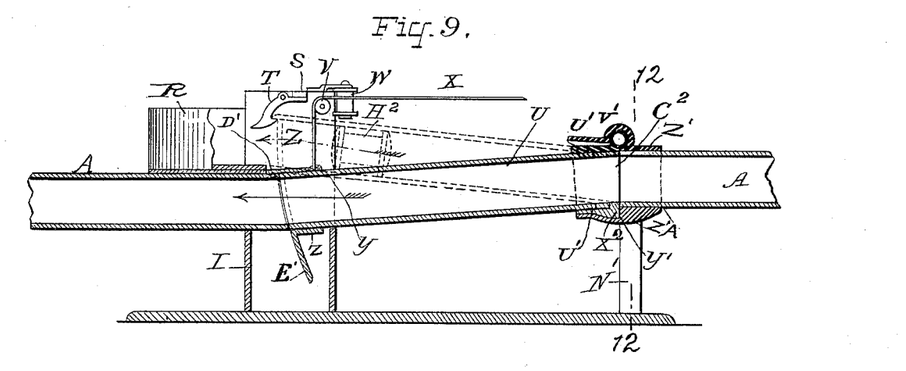
Fig. 9 is a vertical longitudinal section taken on the line 11 11 of Figs. 6 and 7, showing particularly the movable switch-section of the tube for delivering a carrier at a substation into its receiver.
Figure 10:
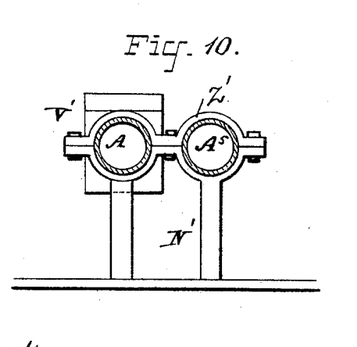
Fig. 10 is a cross-section taken on the line 12 12 of Fig. 9.

The substations 101, interposed in the line or lines of tube A A[5], are also provided with receivers R, (see Figs. 1[a] and 6 to 9, inclusive,) that are supported by a standard I, normally out of connection with the forwarding-tube A. At this point the forwarding-tube A is provided with a movable switch-section U, interposed between the two adjacent ends of the tube and normally forming a continuation thereof, as shown in Fig. 8. At its juncture with the pivoted end of the movable switch-section the tube is supported by a bracket N', and at its juncture with the other end of the switch-section the tube is supported by the standard I. The other tube A[5] may also be supported by said bracket N', both tubes being clamped by a cap-piece Z'. The movable switch-section, as shown in Fig. 9, is capable of movement from its position shown in full lines coinciding with the end of the tube in the standard I to the position shown in dotted lines, with its end in coincidence with the receiver R. The pivotal joint, with the end of the tube in the standard N', is shown in Fig. 9 as a simple hinge-joint, adapting it to swing from its normal position in alinement with the two ends of the tube to its delivering position, one end still in alinement with one end of the tube and the other end in alinement with the receiver. The pivotal end of the switch-section U is provided with a collar U', forming one part of the hinge V', and the cap-piece Z' has a forward projection overlying the top of the switch-section to limit its upward movement. In order that the angle of divergence of the switch-section from the end of the tube in the standard N' to the receiver and to the end of the tube in the standard I may be as little as possible, the tube in the bracket N' is lowered slightly out of line with that in the standard I, as is clearly shown. The delivery or mouth end of the movable switch-section U is provided with a collar Z, having at its upper end a projecting lip D', adapted to rest upon the end of the tube in the standard I and form a stop to hold the movable section in coincidence with said tube, limiting its movement in the downward direction. Said collar also provides a downhanging extension E', adapted when the switch-section is moved into its dotted position to close the end of the tube in the standard I. The meeting ends of said tube A in the standard I and the movable section and the downhanging extension E' are formed on the arc of a circle having the hinge of the movable section as its center, so that the joint is a close-fitting one. The delivery or mouth end of the movable section is adapted to engage with a latch T, pivoted to the standard, so as to hold said section in its up position, the heel of said latch striking a limiting-stop S. The lower end of the latch extends down in front of the mouth of the switch-section in the path of the carrier, being delivered therefrom into the receiver, so that upon the movement of the carrier from the end of the switch-section into the receiver such carrier will strike the end of the latch and rock it to one side, and the switch-section thus released may return by gravity to its normal position in alinement with the end of the tube in the standard I.

In one form of the invention the several movable switch-sections of the tube, as shown in Figs. 1, 1[a], 7, and 9, will be operated by hand from a central point—as, for instance, adjacent the main station 100 or 102—and these connections may obviously be mechanical or electrical. As shown herein, however, the movable sections are operated by a cord or chain X, extending from its proper pull, (numbered 1 to 6, inclusive, in Fig. 1,) leading thence over suitable pulleys W V, and connected with the movable end of the switch-section. In this instance as the attendant is about to send the carrier from the main station 100 or 102 through the tube A he will pull either one of the pulls communicating with the station to which the carrier is to be sent, so as to elevate the proper switch-section from its normal position to the dotted position shown in Fig. 9, so that at the time the carrier arrives at its proper station the switch-section is in position to direct it into the receiver R.

Figure 11:
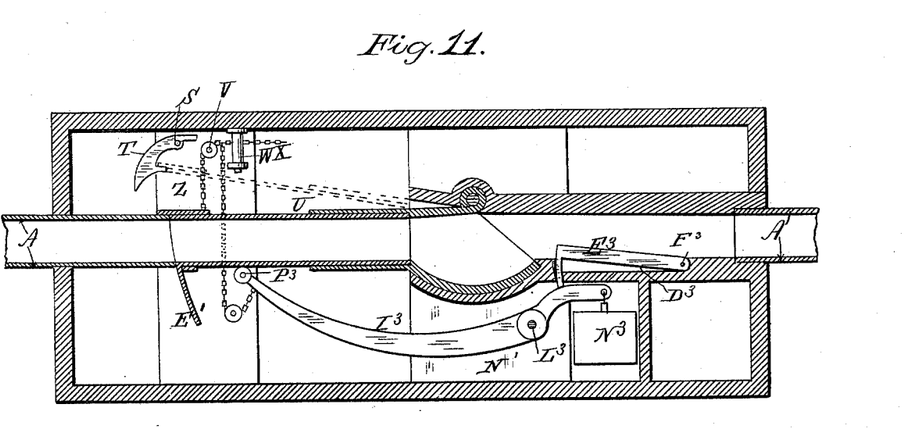
Fig. 11 is a vertical longitudinal section of a modified form of the movable switch-section of the tube, showing a means for automatically moving the switch-section by the passing carrier.
Figure 12:
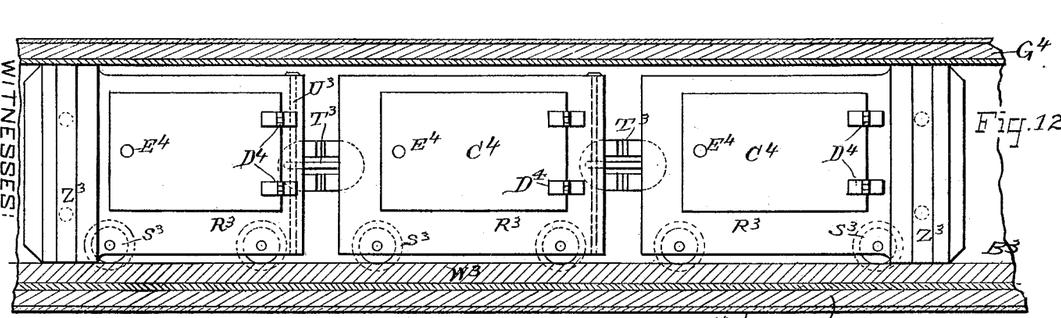
Fig. 12 is a vertical longitudinal section of a tube constructed for underground, showing a sectional carrier.
Figure 13:
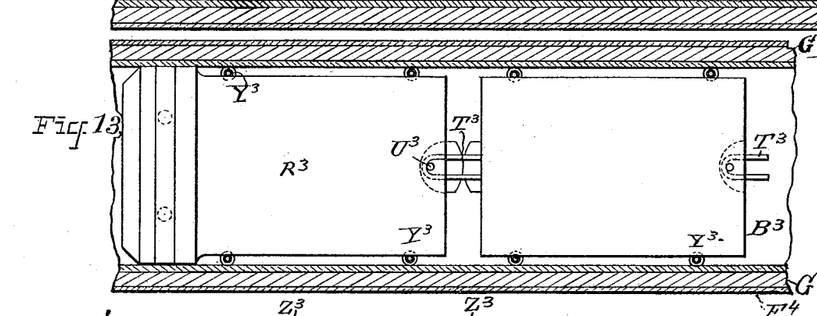
Figure 14:
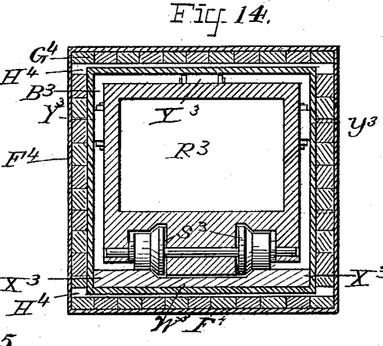
Fig. 14 is a cross-section, of the same.
Figure 15:
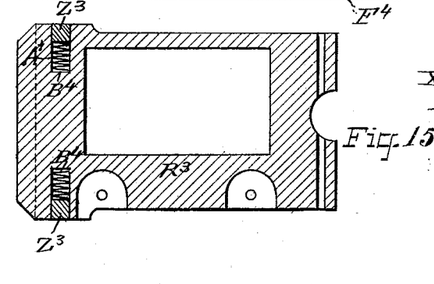
Fig. 15 is a longitudinal section of one of the sections of the carrier.
Figure 16:
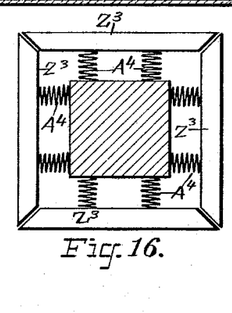
Fig. 16 is a cross-section of the same, showing the spring-pressed bearers in the carrier-head.

Instead of or in addition to the connection with the movable switch-section and the main station for moving the section means may be provided for automatically causing the passing carrier to effect the movement of the switch-section from its normal position into the delivery position in line with the receiver R. Thus, as shown in the modification Fig. 11, the standard N', to which the switch-section U is pivoted, is provided with a tubular extension connected with and forming a continuation of the tube. Just in advance of the pivot of the movable section there is provided a depressible tongue E[3], pivoted at one end in the tubular extension and extending upward into the path of the carrier. The free end of this tongue bears against the short end of a lever I[3], pivoted in the standard N', the longer end of which extends forward and underlies the forward end of the movable switch-section, so that when said lever is rocked, its short end downward and its longer end upward, such lever will move the movable section from its normal down position up to its dotted position in alinement with the receiver R. The short end of the lever is connected with a counterbalancing-weight N[3]. When the carrier passing through the tube strikes the tongue E[3], such tongue will be depressed, and by its contact with the short end of the lever I[3] rocks such lever, so as to throw the movable section upward into its dotted position and direct the carrier into the receiver. The long end of the lever instead of bearing directly against the movable section to lift it may be connected with the cord or chain X, so that it will pull upon such chain and thereby raise the movable section, and this cord or chain X may extend to the main station, as before described, so that the movable section U may be operated from that point, if desired. As soon as the carrier has passed from the movable section into the receiver the latch T will have been tripped, as before described, and the movable section be then free to return to its normal position by gravity, returning the lever $I^3$ to its normal position and resetting the tongue $E^3$ ready to be operated by another carrier.

The carrier-despatching device K is substantially the same at the main and sub stations, except that when the main station or any other station is provided with more than one forwarding-tube A the despatching device will be duplicated, if need be, to deliver the carrier to the proper forwarding-tube. As shown in Fig. $1^a$, where two forwarding-tubes are employed, there are shown two despatching devices K. These despatching devices (shown in section in Fig. 8) consist each of a disk mounted to rotate on a central bolt N, held in place by the nut O'. The disk in depth is about the length of a carrier and is provided with a number of openings or pockets $L^6$, adapted to receive the carrier, so that when the disk is rotated each of the openings may be brought in line with the mouth of the forwarding-tube A and also with the end of the adjacent tube, such as the elbow H, as in Figs. $1^a$ and 4, so that the air behind the carrier and the suction in front of it will cause such carrier to be removed from the pocket of the delivery device and transmitted to the distant station. To hold the delivery-disk in position, there may be provided a spring-pressed bolt Q, Fig. 8, carried by the framework and adapted to enter one or the other of a series of holes P in the disk. When the disk is to be moved, this spring-bolt is withdrawn by hand, permitting the disk to be rotated until the bolt engages another hole P.

It is obvious that the several novel features of the apparatus heretofore described are adapted to a much larger apparatus than would ordinarily be placed in a store or warehouse, a section of such larger apparatus being represented in Figs. 12 to 16, inclusive. In this case, to gain strength and prevent undue accumulation of moisture, the tube or conduit is square in cross-section and is made up of an inner tube $B^3$ and an outer tube $F^4$, the space between the two tubes being filled with suitable material, such as brick $G^4$, the two walls of the outer tube being braced by a proper tie-bar $H^4$. The bottom of the tube is provided with a metal rail $X^3$, having a central depression $W^3$, adapted to receive the flanges of a pair of wheels $S^3$, mounted in the under side of the carrier $R^3$. The carrier in this case is formed in three sections. The ends of the two outer sections are each provided with an enlarged head arranged to fill the tube, and these heads carry spring-pressed bearers $Z^3$, pressed outward by springs $A^4$ to prevent the escape of air past the carrier, as is usual. The carriers are hollow, having side openings closed by doors $C^4$, that are hung upon hinges $D^4$ and have latches or other catches $E^4$ to lock them closed. The several sections of the carrier are connected together by links $T^3$, one end of the links being engaged by a vertical bolt $U^3$. This connection permits the several sections of the carrier to pass readily around curves without undue friction. To otherwise steady each section of the carrier and prevent them from leaving the track, each section may be provided with side and top guide-rolls $Y^3$, adapted to bear against the inner surface of the tube.

What is claimed is—

1. The herein-described pneumatic-tube apparatus consisting of a forwarding and a return tube connected to form a continuous carrier-guiding circuit, having stations for reception and delivery of the carrier, a blower having its air receiving and delivery pipes connected with said tube, and a supplemental air-forcing device having its delivery-pipe connected with said tube and its air-receiving pipe or opening in communication with the atmosphere, substantially as set forth.

2. The combination with a receiver, of tubes communicating therewith, gates situated opposite each other, opening toward the receiver and closing said tubes, forwarding-tubes connected with the first-mentioned tubes, and deflectors for directing the carriers into said receiver, substantially as set forth.

3. The herein-described gooseneck-terminal connected at each end with the delivery end of a tube, a perforated deflecting-plate in each end of the gooseneck, openings from the terminal leading to a common receiver, and gates closing said openings.

4. The combination with a tube, of a despatching device consisting of independent rotary disks mounted in the same plane and on axes parallel with the tube and having carrier-pockets smaller than said tube and adapted to be placed opposite the end thereof so as to receive air therefrom, and despatch-tubes one for each disk of smaller diameter than the first-mentioned tube, substantially as set forth.

5. The herein-described casing provided with a longitudinal channel, and with two blower-chambers, the one chamber communicating on its suction and on its pressure sides with said channel and the other chamber communicating on its pressure side with the same channel.

6. The herein-described casing having two longitudinal channels therethrough for connection with the ends of two lines of tube, duplicate pairs of blower-chambers communicating with said channels, one blower of each pair communicating on its suction and its pressure sides with its channel and the other blower of each pair communicating on its pressure side with the same channel.

7. The herein-described movable switch-section interposed between adjacent ends of a line of tube, a latch for holding the switch-section in one position and extending in front of the mouth of the switch-section and in line with the movement of the carrier to be released by the carrier in passing from said section.

8. The herein-described rectangular carrier adapted to a rectangular tube, having a rectangular head, each side of the rectangle having spring-pressed bearers 23.

9. The combination with a pneumatic tube, of an oscillating section, a tongue or trip projecting into the tube, and means for balancing such section engaged by said tongue or trip, substantially as set forth.

10. The combination with a pneumatic tube, of an oscillating section, a trip or tongue projecting into the tube and connected with the section to move it, and a catch for holding open said section and having a part in the path of the carrier whereby the latter may release the section, substantially as set forth.

11. The combination with the tube, of the lever or tongue $E^3$ therein, an oscillating switch-section, and a lifting-lever for moving said section having one arm engaged by said tongue, substantially as set forth.

12. In a carrier apparatus a plurality of fans disposed in tandem, and a conduit common to both of said fans and continuous and having communication with the exhaust side of one of said fans, substantially as set forth.

13. In a carrier apparatus a plurality of fans disposed in tandem, and a continuous and endless conduit common to both of said fans, substantially as set forth.

In testimony that I claim the foregoing as my invention I have signed my name, in presence of two witnesses, this 13th day of April, 1892.

ASA JOHNSON.

Witnesses:
JOHN MACDOUGALL,
JOSEPH THOMPSON SMITH.